Aug. 2, 1960 — S. H. FROHMADER ET AL — 2,947,452
GRAVITY WATER DISTRIBUTOR
Filed Sept. 10, 1957 — 2 Sheets-Sheet 1

Inventors,
Carl B. Rowe,
Stanley H. Frohmader
and John A. Selvaag,
By: Jones, Darbo & Robertson, Attys.

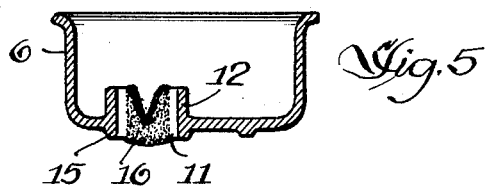
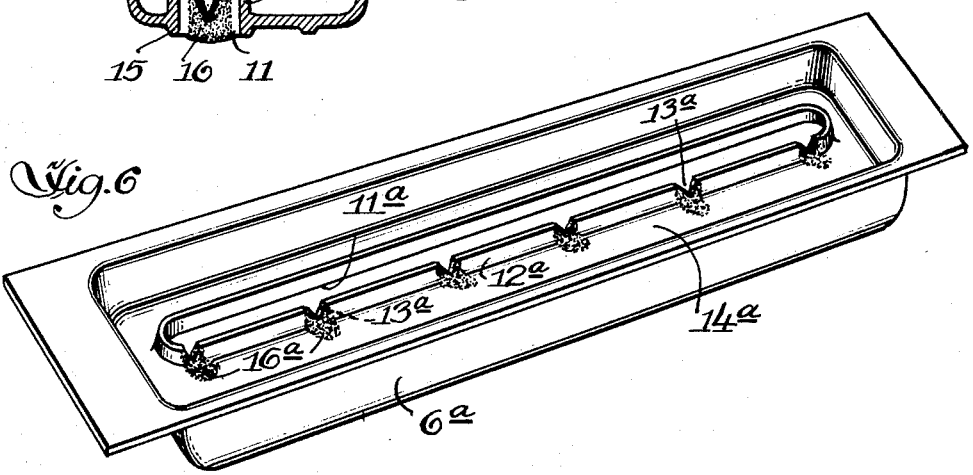
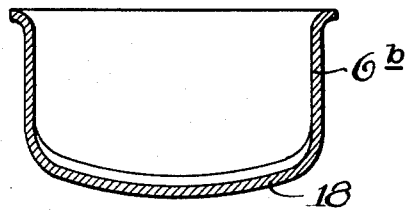
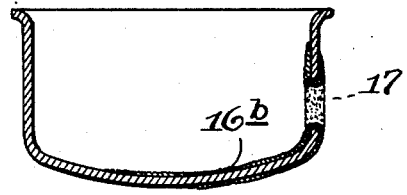
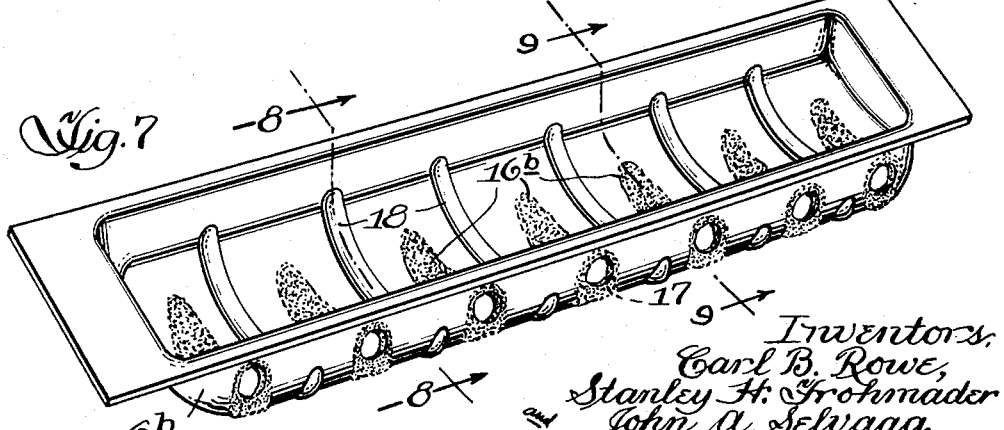

United States Patent Office 2,947,452
Patented Aug. 2, 1960

2,947,452
GRAVITY WATER DISTRIBUTOR

Stanley H. Frohmader, Carl B. Rowe and John A. Selvaag, Madison, Wis., assignors to Research Products Corporation, Madison, Wis.

Filed Sept. 10, 1957, Ser. No. 683,183

14 Claims. (Cl. 222—187)

This invention relates to apparatus for contacting large surfaces of a liquid, such as water, with a gas, such as air, for the purpose, for example, of humidifying or cooling air. More particularly, it refers to an improved means for the uniform distribution of water to an evaporative element in such an apparatus.

The humidification of dry air normally occurring in buildings during the winter heating season, and the cooling of hot summer air in arid areas by the evaporation of water thereinto, depends upon the efficient evaporation of water from the continously wetted surfaces of an evaporative element or pad as, for example, an interstitial body having extensive surfaces to provide a large area of contact of the air with water. The air to be humidified or cooled is forced through the openings of the element where it contacts the wet baffles or fibers of which the evaporative element is composed. Exposure of relatively large water surfaces in this way results in the evaporation of large amounts of the water. In the humidifying operation, in order to increase the moisture-holding capacity of the air and the rate of evaporation of the water, it is frequently the practice to heat the air before conducting it to the evaporative element.

Regardless of the particular purpose for bringing the gas and liquid into contact with each other, it is always desirable in this type of apparatus to expose the largest possible liquid surface to the gas. For a given gross surface of the structure of an evaporative element, evaporation efficiency depends upon the proportion of this surface that is kept continuously wetted so that the largest possible surface of the liquid to be evaporated will continuously be exposed to the gas for evaporation. The invention is directed to this particular aspect of evaporator efficiency.

An example of the type of evaporating apparatus in which the gravity water distributor of the invention is useful is shown in Patent No. 2,637,540. In this type of apparatus, the liquid to be evaporated is continuously supplied to the top of the evaporative element to flow by gravity and wicking action over all surfaces of the structure thereof. It will be understood that the evaporative element may be formed from fibrous material, expanded sheet material such as aluminum foil, fabricated mesh material or other materials of the type used in air filters, especially filters of the impingement type. In the description of the invention and the claims appended hereto, reference will be made for simplicity and clarity to apparatus in which water is evaporated by air, it being understood that other liquids and gases may be used in the same manner that the water and air are used.

In the gravity fed evaporative apparatus, unless the water is supplied uniformly over the entire length and breadth of the top of the evaporative element, a portion of the area of the element structure will not be wetted and will not, therefore, be operative in the apparatus. Uniform distribution of the water supplied to the evaporative element does not mean that the same amount of water is supplied to every increment of the surface of the element, but rather that the same amount of water is supplied at each point of discharge from the distributor, the number and spacing of such points of discharge being a matter of design depending in large part upon the wicking characteristics of the evaporative element surfaces over which the water creeps from each point of supply by wicking action and gravity.

Where the relative humidity of the air passing into the evaporative element is very low, the rate of evaporation is correspondingly high and element surfaces are rapidly dried unless dependable means are provided for preventing evaporation to dryness at any time. The development of this undesirable condition may be somewhat overcome by using a large excess of water. This expedient is generally unsatisfactory because water entrainment and leakage problems are thereby aggravated, and operation of the apparatus is thereby rendered excessively costly. An efficient distribution of the water is greatly to be preferred.

It has been found that the use of troughs of ordinary material, such as sheet metal, having perforated bottoms and supported above the evaporative element result in haphazard and non-uniform distribution of the water. The same is true where the side walls of the troughs have horizontal lines of spaced discharge openings which would normally be expected to provide equal flow through all such openings. Water continuously supplied to the trough in an amount only slightly in excess of evaporative capacity of the element builds up only a small head of water in the distributor trough. Since the flow-inducing force produced by the small head of water is relatively weak compared to the surface tension of the water, it has been observed that the surface tension will tend to hold the water back at the controlling discharge apertures in the trough, forming a meniscus at each aperture with no flow of the water through the aperture, until a sufficiently large head of water is built up at which time the meniscus is broken and the water then gushes through the aperture and down upon the evaporative element. Because of varying conditions at the several discharge apertures, this breaking of the meniscus and gushing of the water invariably takes place at less than all of the discharge apertures, and sometimes at only a single aperture, with the result that flow distribution from the trough is fortuitous and erratic so that an excessive amount of water is supplied to the evaporative element at some locations while other portions of the element are starved and therefore dry. When the trough has been substantially drained by this relatively rapid discharge, flow stops entirely and the cycle repeats itself. It will be seen that distribution of the water with this type of distributor is erratic both as to time and place.

It is possible to reduce this surface tension effect by placing a section of wicking material, such as sponge, around the discharge openings. However, such material is subject to dimensional distortion due to shrinking and also to rotting and the formation of micro-organisms therein. The introduction of suitable surface-active agents into the water supplied to the distributor trough also improves the uniformity of distribution, but this also greatly adds to the cost of operation of the equipment.

It is, accordingly, an object of the present invention to provide a gravity water distributor for evaporative apparatus of the type described which is capable of uniformly distributing water, or other liquid, by gravity and with good control, over an extended area. It is a further object to provide such a distributor which will maintain its distribution efficiency over a long period of time and with a minimum of servicing.

More specifically stated, it is an object of the invention to provide a gravity liquid distributor having a permanent and improved steady flow promoting surface at each discharge opening whereby the evaporative element of a gas-liquid contact apparatus may be continuously supplied with well-distributed liquid to effect maximum evaporative efficiency of the apparatus. More specifically stated, an object is to provide such a distributor with hydrophilic surfaces, which may also have wicking characteristics, at the flow-controlling trough discharge openings.

Further objects and advantages of the invention will become more apparent from the following description and the accompanying drawings, wherein Fig. 1 is an elevation view, partly in section, of typical gas-liquid contact or water-evaporating apparatus using the distributor of the invention;

Fig. 5 is a cross-sectional view similar to that of Fig. 3 and showing the details of a modified form of discharge opening;

Fig. 6 is a perspective view of a modified form of the distributor;

Fig. 7 is a perspective view of another alternative form of distributor;

Fig. 8 is a cross-sectional view of the distributor of Fig. 7 taken at line 8—8 thereof, and Fig. 9 is a cross-sectional view of the distributor of Fig. 7 taken at line 9—9 thereof.

It has been discovered that if hydrophilic surfaces are provided at at least the lowermost portions of the discharge openings of the distributor, such surfaces will promote the steady flow of water through each such discharge opening with resulting uniform flow of water through all discharge openings of the distributor. The distributor according to the present invention comprises a trough-like container having uniformly spaced discharge openings in liquid retaining vertical walls thereof and having hydrophilic surfaces at at least the flow-controlling edges of each of the discharge openings and preferably areas immediately adjacent thereto. In a further aspect of the invention, these surface portions also provide a wicking action and generally extend somewhat along the bottom of the distributor, being thus continuously wetted by the water therein.

Figure 1:
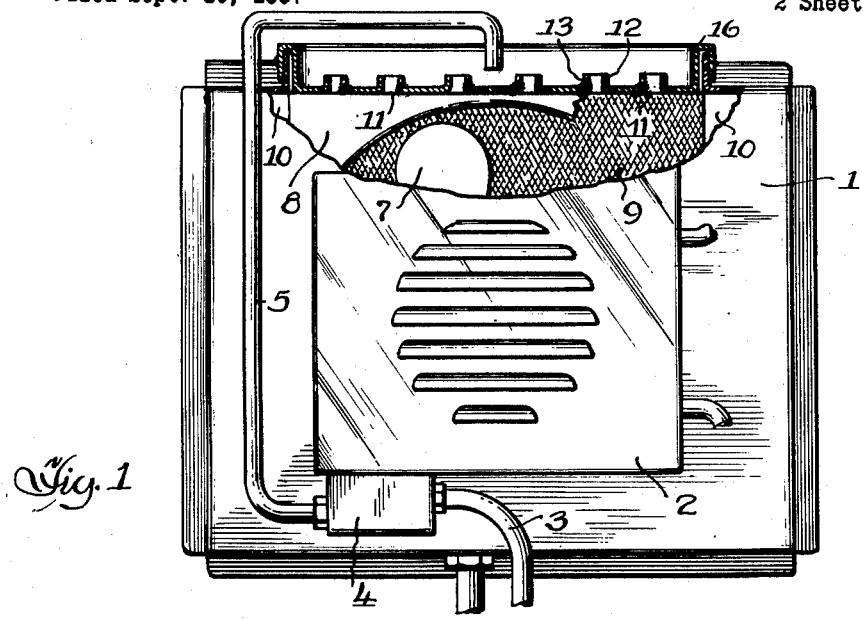

As an example of the type of apparatus in which the gravity water distributor of the invention may be used, a humidifier is shown in Fig. 1. This assembly includes a humidifier housing 1 upon which is mounted a fan motor housing 2 containing an electric motor (not shown) therein, a water feed line 3, a solenoid valve 4 for controlling the flow of water, and a distributor supply line 5 for feeding water to the trough-like distributor 6. A fan 7, driven by the electric motor, turns in a circular opening in fan baffle 8 to draw air through evaporative element 9 after which the humidified air is discharged from the apparatus through ducts 10. The evaporative element is a suitable interstitial filter-like body which is mounted directly under discharge openings 11 of distributor 6, preferably in contact with it, to be continuously supplied with water for evaporation by the air drawn through the apparatus as described.

Figure 2:
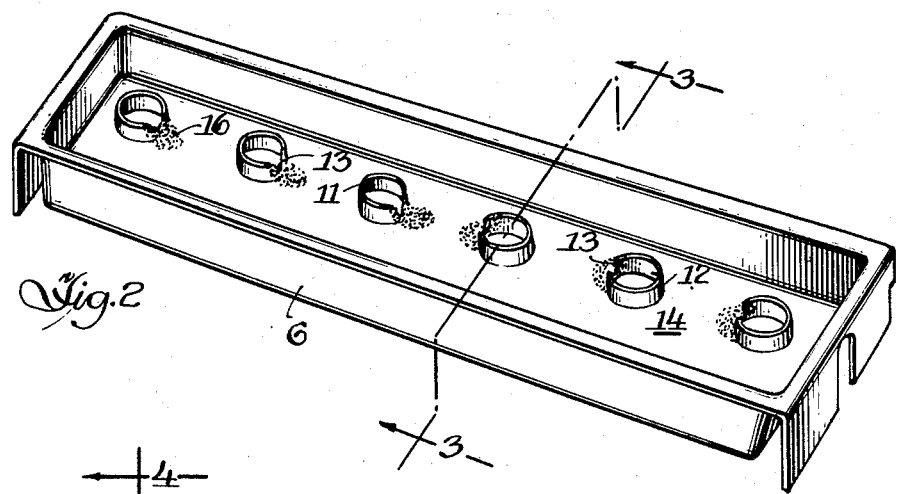
Fig. 2 is a perspective view of one form of the liquid distributor.

The distributor itself, shown separately in Fig. 2, is provided with water discharge apertures 11 equally spaced along the length of the bottom of the separator to permit passage of water from the distributor to the interstitial evaporative element 9. The length of the distributor is substantially equal to the length of the top edge of the evaporative element.

In the particular form of distributor structure shown, the discharge apertures 11 are provided with V-notch weirs formed by cylindrical risers 12 which may, if desired, be upstruck from the metal of which the distributor is made. The risers form dams which restrict the flow of water from the distributor trough to the notches 13 which are cut in the risers. Preferably, the bottoms of the V-notches are at an elevation somewhat above that of the bottom 14 of the distributor trough, as is best shown at 15 in Fig. 4, as in this way a limited depth of water is normally maintained in the trough to minimize the effect of some deviation from true level of the trough on the uniformity of distribution of the water throughout the length of the distributor.

In accordance with the invention, the surfaces of the distributor in the vicinity of V-notches 13 are hydrophilic, being covered in this particular embodiment of the invention by a permanently adhering coating of an insoluble hydrophilic composition. Although the hydrophilic coating could cover the entire interior of the distributor trough, this is not necessary and it is generally more convenient to apply the coating only to limited areas 16 which include the surface of bottom 14 of the trough immediately adjacent V-notches 13 and the portions of the dam risers 12 including and immediately adjoining at least the lowermost portions of the V-notches. The important thing is that the critical surfaces which control the flow of water from the distributor trough discharge apertures 11 be covered to thus provide a continuously wet surface covering the normally hydrophobic surfaces of the distributor trough. These continuously wet surfaces prevent the meniscus formation above described and promote the steady flow of water from the supply within the distributor.

Any of a number of hydrophilic materials may be used for the flow-promoting coating. Examples of readily wettable compositions include insolubilized glues and gelatin, insoluble hydroxycellulose ether, cellulose regenerated from viscose, and resins with hydrophilic substituent groups such as ion-exchange resins. These materials may be painted onto the areas to be coated using a suitable solvent or by melting and applying while thus fluid.

Additional advantages result from the use of hydrophilic materials which also exhibit wicking characteristics. While flow through the discharge openings is promoted by the hydrophilic surfaces which prevent meniscus formation at the openings, uniformity of flow through all of the spaced discharge openings of the distributor depend upon the accurate leveling of the distributor so that the head of water at each opening is the same. If, however, the surfaces at the discharge openings also have the ability to conduct water to the discharge openings by wicking action, the effect of slight inclination of the distributor is minimized for low rates of flow, since the rate of flow to the several openings is then not entirely dependent upon the level of the water at each opening. Accordingly, the invention contemplates the provision of wicking surfaces at the discharge openings, such surfaces being also hydrophilic. A distributor provided with hydrophilic wicking coatings at the several discharge openings may be employed for a wide range of rates of flow of water to and from the distributor.

A further advantage of the wicking action resides in the complete drainage of the distributor trough after the supply of water thereto is shut off, as in the intermittent operation of a humidifier. Instead of being left to evaporate and deposit mineral matter in the trough, the water is conducted by wicking action to the several discharge openings and thus removed from the distributor.

Although any suitable insoluble hydrophilic wicking material may be used for the coating at the discharge openings, a mineral coating is preferred because of the generally greater resistance to the action of water of such a composition. A suitable wicking composition may be one such as is disclosed in the co-pending application Serial No. 664,231 for Mineral Coated Contact Pad by the present applicant. It may be prepared and applied by mixing together a slurry of a finely divided mineral, a mineral fiber, a water-soluble silicate, and water, coating the slurry around the water passage at the V-notch, preferably extending down the wall of the riser to the bottom of the distributor, and subsequently drying the coating to render it substantially insoluble. The mineral fiber may be omitted for some uses, but the resulting coating will have somewhat poorer wicking properties. The coating is so placed that it provides a path for water from the trough, over the gate of the aperture, and down the internal side of the weir, preferably to a point below the level of the bottom of the inside of the trough, whereby uniform streams of water flow out from the several discharge openings of the distributor.

An example of a suitable hydrophilic wicking composition is described in the following example:

A coating composition was produced using the following formula:

| | Percent |
|---|---|
| Peerless #1 clay (hydrous aluminum silicate clay) | 13.00 |
| Asbestos shorts (asbestos fiber) | 13.00 |
| Sodium silicate (29% $SiO_2$; 8.9% $Na_2O$) | 10.00 |
| Darvan #1 wetting agent (sodium salt as a polymerized alkyl sulfonic acid in the form of a powder) | 0.25 |
| Caustic soda | 0.25 |
| Soft water | 63.50 |

Figures 3, 4:
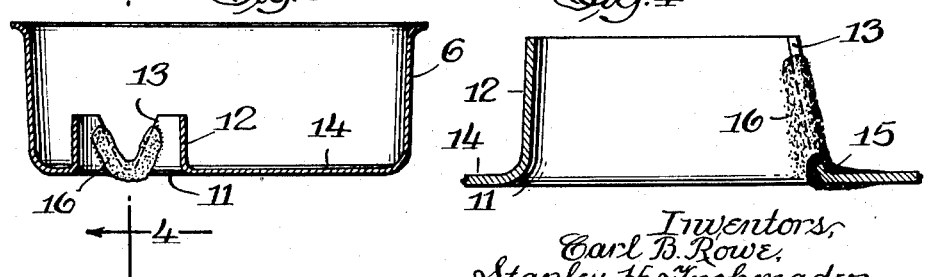
Fig. 3 is a cross-sectional view of the distributor of Fig. 2 taken at the line 3—3 thereof.
Fig. 4 is an enlarged cross-sectional view taken at the line 4—4 of Fig. 3 and showing a single discharge weir.

The wetting agent, caustic soda, and sodium silicate were added to the water and mixed until a complete solution of all ingredients was obtained. The clay and asbestos fibers were then added and mixed with good turnover for about one hour until the mixture became smooth. The slurry thus prepared was coated about the riser collars and notches of a water distributor such as shown in Figures 2–4. Prior to coating, the sheet metal distributor trough was cleaned to remove all oil and other foreign matter. The slurry was then brushed on the inside and outside surfaces at and adjacent the V-notches. The coating was allowed to air dry, and subsequently baked for one hour at a temperature of 110° C. to expedite insolubilization, although such baking is not essential. When cooled, the coating was readily wetted and exhibited excellent wicking properties, and when water was supplied to the distributor an even water flow was obtained from all weir discharge openings.

Since the surface conditions at the discharge openings influence the flow behavior and make it possible to achieve the desired results, it will be understood that the body of the distributor trough, at least the portion forming and adjacent discharge apertures, may be composed of hydrophilic or hydrophilic wicking material. For example, the trough may be formed of unglazed earthenware or a moldable hydrophilic resin, such as an ion exchange resin. The objectives of the invention are thus attainable either by using hydrophilic structural materials or by coating hydrophobic structural materials with hydrophilic compositions.

An important operational feature of the distributor of the invention resides in its ability to evenly distribute water over a wide range of rates of flow, including very low flow rates. For example, to serve an evaporative element having the dimensions, 10" x 10" x 2", a convenient size commonly used in the type of apparatus shown in Fig. 1 for residential ventilating air humidification, it has been found possible to achieve uniform flow through all distributor discharge openings with a water supply rate of one-half gallon per hour to the distributor. Reliable flow rates as low as 0.09 gals./hour/discharge opening have been obtained.

It will be understood that many structural variants may be employed in carrying out the essential concept of the invention. Some modification possibilities are illustrated in Figs. 5–9. In the form of distributor trough illustrated in Fig. 5, this cross-sectional view being similar to the view of Fig. 3, a ring or snout 15 surrounds discharge aperture 11 on the underside of distributor trough 6 to establish a lower level than that of the underside of the trough so that water flowing down through aperture 11 will drip directly down from the aperture rather than be carried along the underside of the trough as might otherwise happen if the trough is somewhat inclined. In the apparatus shown in Fig. 1, the trough is generally in direct contact with the evaporative element so that water passing through the several discharge apertures is immediately taken into the body of the element. Such contact is not necessary to avoid the possibility of lateral flow along the underside of the trough when rings 15, or similar flow directing means, are employed.

The distributor trough 6a shown in Fig. 6 is similar to that illustrated in Fig. 2 in that an interior riser is provided inside of the trough to form a weir dam. Instead of the several cylindrical risers 12 of trough 6, a single weir dam 12a rises from bottom 14a of the distributor trough at the perimeter of a single discharge aperture 11a extending almost the full length of the trough 6a. V-notches 13a are cut at spaced intervals along the length of at least one side of the weir dam to complete a series of weirs through which the water may flow from the reservoir within trough 6a surrounding the dam. A suitable hydrophilic or hydrophilic wicking coating 16a is provided at and adjacent each V-notch in the manner and for the purposes above described.

In the form of distributor illustrated in Figs. 7–9, the discharge openings 17 are shown as circular holes spaced in a horizontal line along one side of trough 6b. The surfaces at and adjacent each hole are coated with a hydrophilic or hydrophilic wicking composition 16b, the coating extending well down into the lowermost portion of the trough and similarly along the outside surfaces of the trough under each opening to conduct the water to a desired point of discharge below the level of water in the trough. Grooves 18 are impressed transversely in the bottom of the trough between discharge openings to form beads extending across the undersides of the trough to prevent creeping of the water lengthwise along the underside of the distributor trough.

The several forms of distributor troughs herein shown and described by way of example may be constructed from any type of material which is suitable as a container for the water or other liquid to be fed to the evaporative element. Sheet metal of a composition or suitably treated to resist corrosion is satisfactory. Plastic materials may also be used, as, for example, polystyrene, polyethylene, phenolic molding compounds, epoxy resins, etc. In the event that the mineral coating does not adhere well to the plastic surface, the surface may be pretreated by applying a bonding agent, such as a lacquer, to the areas to be coated with asbestos fibers imbedded in the lacquer. When the lacquer has dried, the loose fibers may be brushed off and the mineral coating composition applied over the adhering fibers. The distributor may also be made of a suitable polyester resin reinforced with glass fibers. Surfaces may be sandblasted to provide reliable bonding for a coating composition.

As a specific example of the last mentioned type of structure, a highly satisfactory distributor having excellent water flow characteristics was fabricated from glass fiber reinforced polyester resin and an intumesced mineral coating was applied at the discharge openings. The surfaces at the discharge openings to be coated were roughened by sand blasting and then coated, by painting or spraying, with a slurry prepared by mixing about five grams of finely divided wollastonite with thirty grams of a solution of sodium silicate containing 29% $SiO_2$ and 9.5% $Na_2O$, enough water being then added to provide a consistency which was convenient for application to the distributor surfaces. After the coatings so applied had dried, the coatings were subjected to a flame until the coating material puffed appreciably. The coatings so applied were found to be adherent, insoluble and remarkably active in the rapid diffusion of water. Subsequent investigation indicated that the relative amount of the mineral, wollastonite or an equivalent mineral, used in the slurry for the coating is not critical and may be varied over a wide range and still give highly useful results. If the glass fiber is adequately exposed, as by sand blasting, the wollastonite or other mineral need not be used, as the apparent function of the mineral, the insolubilization of the silicate, is then carried out by reaction of the silicate with the glass. Potassium silicate may be used in place of the sodium silicate.

Invention is claimed as follows:

1. A distributor for the uniform supply of water by gravity flow to an extended area comprising a trough-like container having a plurality of spaced discharge openings in a vertical liquid-retaining wall of said container, the lowermost portions of said openings being at approximately the same level, and a water insoluble hydrophilic composition adherently coating at least the surfaces of said container at and immediately adjacent each said discharge opening at said lowermost portions thereof whereby to promote the steady and uniform flow of water from said trough-like container through all of said discharge openings.

2. A distributor for the uniform supply of water by gravity flow to an extended area comprising a trough-like container having a plurality of spaced discharge openings in a vertical liquid-retaining wall of said container, the lowermost portions of said openings being at approximately the same level, and a water insoluble hydrophilic wicking composition adherently coating at least the surfaces of said container at and immediately adjacent each said discharge opening at said lowermost portions thereof whereby to promote the steady and uniform flow of water from said trough-like container through all of said discharge openings.

3. A distributor in accordance with claim 2 wherein the discharge openings are V-shaped.

4. A distributor in accordance with claim 2 wherein the level of the lowermost portions of the discharge openings is above the level of the bottom of the trough-like container.

5. A distributor in accordance with claim 2 wherein the liquid-retaining wall having the discharge openings therein comprises a riser extending up from the bottom of said container to form a dam spaced from the side walls of said container, and said discharge openings are V-notches.

6. A distributor in accordance with claim 2 and including flow-guiding beads protruding down from the underside of the container to limit the flow of liquid along the underside of the distributor.

7. A distributor in accordance with claim 2 wherein the trough-like container is made of glass fiber reinforced polyester resin and the wicking composition comprises finely divided wollastonite and an initially water-soluble silicate, the composition being applied to roughened surfaces of said container.

8. A distributor in accordance with claim 2 wherein the wicking composition coating extends over at least the portion of the bottom of the trough-like container adjacent each discharge opening and the lowermost portion of the periphery of the discharge opening.

9. A distributor in accordance with claim 2 wherein the wicking composition coats all surfaces of the trough-like container over which water therein must flow from the bottom of said container through said discharge openings to the points of departure of water at the under side of said container.

10. A distributor in accordance with claim 2 wherein the wicking composition comprises (1) a finely divided mineral, (2) mineral fibers, and (3) an initially water-soluble silicate.

11. A distributor in accordance with claim 8 wherein the coating also extends over the exterior surface of the trough-like container from each discharge opening downwardly at least to the level of the inside of the bottom of said container.

12. A distributor adapted to feed water by gravity flow uniformly over a horizontal area to a body arranged therebelow comprising a trough-like container having a plurality of spaced discharge apertures in the bottom thereof, a weir associated with each said discharge aperture to control the rate of flow of water from said container through said discharge apertures, each said weir comprising a riser extending upwardly from the bottom of said container and surrounding the periphery of the associated aperture to form a dam obstructing the flow of water from said container through said aperture, each said riser having a V-notch therein at a level common to all weirs and at a level above that of the bottom of said container, and a water insoluble mineral wicking composition adherently coating all surfaces of said container at said weirs in the flow path followed by water passing from said container through said weirs and said discharge apertures to points of gravity departure from said container.

13. A distributor in accordance with claim 12 and including a snout extending downwardly from and surrounding each discharge aperture at the underside of the container to prevent lateral flow of water from the discharge aperture along the under side of the container.

14. A distributor adapted to feed water by gravity flow uniformly over a horizontal area to a body arranged therebelow comprising a trough-like container having an elongated discharge aperture in the bottom thereof, a riser extending upwardly from the bottom of said container and surrounding the periphery of said aperture to form a dam obstructing the flow of water from said container through said aperture, said riser having a series of spaced V-notches therein at a level common to all said V-notches and above that of the bottom of said container, and a water insoluble mineral wicking composition adherently coating the surfaces of said container from the bottom thereof to and through said V-notches and dam along the exterior surfaces of said riser to the lowermost extremity thereof.

References Cited in the file of this patent

UNITED STATES PATENTS

| | | |
|---|---|---|
| 1,213,782 | Thomas | Jan. 23, 1917 |
| 2,095,451 | Reynolds | Oct. 12, 1937 |